(12) United States Patent
Rozner et al.

(10) Patent No.: US 11,176,427 B2
(45) Date of Patent: Nov. 16, 2021

(54) OVERLAPPING CNN CACHE REUSE IN HIGH RESOLUTION AND STREAMING-BASED DEEP LEARNING INFERENCE ENGINES

(71) Applicant: International Business Machines Corporation, Armonk, NY (US)

(72) Inventors: Eric Rozner, Boulder, CO (US); Chungkuk Yoo, Daejeon (KR); Inseok Hwang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 16/142,612

(22) Filed: Sep. 26, 2018

(65) Prior Publication Data
US 2020/0097778 A1   Mar. 26, 2020

(51) Int. Cl.
  *G06K 9/66* (2006.01)
  *G06K 9/00* (2006.01)
(52) U.S. Cl.
  CPC ........... *G06K 9/66* (2013.01); *G06K 9/00718* (2013.01)
(58) Field of Classification Search
  CPC .... G06K 9/00718; G06K 9/56; G06K 9/4642; G06K 9/6271
  See application file for complete search history.

(56) References Cited

U.S. PATENT DOCUMENTS

| 8,081,816 B1 | 12/2011 | Irick et al. |
| 9,280,830 B2 | 3/2016 | Irie et al. |
| 9,864,933 B1 | 1/2018 | Cosic |

(Continued)

FOREIGN PATENT DOCUMENTS

| CN | 106250103 | 12/2016 |
| CN | 107506707 | 12/2017 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Marcos L Torres
(74) *Attorney, Agent, or Firm* — Law Office of Jim Boice

(57) ABSTRACT

A method optimizes Convolutional Neural Network (CNN) inference time for full resolution images. One or more processors divide a full resolution image into a plurality of partially overlapping sub-images. The processor(s) select, from the plurality of partially overlapping sub-images, a first sub-image and a second sub-image that overlap one another in an overlapping area. The processor(s) feed the first sub-image, including the overlapping area, into a Convolutional Neural Network (CNN) in order to create a first inference result for the first sub-image, where the CNN has been trained at a fine resolution. The processor(s) cache an inference result from the CNN for the overlapping area, and then utilize the cached inference result when inferring the second sub-image in the CNN. The processor(s) then identify a specific object in the full resolution image based on inferring the first sub-image and the second sub-image.

20 Claims, 14 Drawing Sheets

(56) References Cited

U.S. PATENT DOCUMENTS

| | | | | |
|---|---|---|---|---|
| 2013/0216094 | A1* | 8/2013 | DeLean | G06K 9/00335 |
| | | | | 382/103 |
| 2015/0302583 | A1* | 10/2015 | Jeon | G06T 7/0016 |
| | | | | 382/128 |
| 2017/0103299 | A1 | 4/2017 | Aydonat et al. | |
| 2017/0221176 | A1 | 8/2017 | Munteanu et al. | |
| 2018/0046903 | A1 | 2/2018 | Yao et al. | |
| 2018/0150684 | A1 | 5/2018 | Wang et al. | |
| 2018/0158197 | A1 | 6/2018 | Dasgupta et al. | |
| 2018/0181838 | A1 | 6/2018 | Yang | |
| 2018/0189587 | A1 | 7/2018 | Mandal et al. | |
| 2019/0073553 | A1* | 3/2019 | Yao | G06K 9/46 |

FOREIGN PATENT DOCUMENTS

| | | |
|---|---|---|
| CN | 107862650 | 3/2018 |
| WO | 2018071546 | 4/2018 |
| WO | 2018145308 | 8/2018 |

OTHER PUBLICATIONS

Zhu, Y., et al., "Euphrates: Algorithm-SoC Co-Design for Low-Power Mobile Continuous Vision", ACM/IEEE 45th Annual International Symposium on Computer Architecture (ISCA), 2018, pp. 1-14.

M. Xu et al., "Deepcache: Principled Cache for Mobile Deep Vision", <https://arxiv.org/abs/1712.01670> 2018, pp. 1-16.

M. Xu et al., "Accelerating Convolutional Neural Networks for Continuous Mobile Vision via Cache Reuse", <https://www.researchgate.net/publication/321570921_Accelerating_Convolutional_Neural_Networks_for_Continuous_Mobile_Vision_via_Cache_Reuse>, Dec. 2017, pp. 1-13.

L. Huynh et al., "Deepmon: Mobile GPU-Based Deep Learning Framework for Continuous Vision Applications", ACM, MOBISYS'17, 2017, pp. 82-95.

L. Cavigelli et al., "CBINFER: Change-Based Inference for Convolutional Neural Networks on Video Data", <http://arxiv.org/pdf/1704.04313.pdf> 2017, pp. 1-8.

M. Buckler et al., "EVA2: Exploiting Temporal Redundancy in Live Computer Vision", <https://arxiv.org/abs/1803.06312>, 2018, pp. 1-14.

M. Courbariaux et al., "Binarized Neural Networks: Training Neural Networks With Weights and Activations Constrained to +1 or −1", <https://arxiv.org/abs/1602.02830>, 2016, pp. 1-11.

M. Rastegari et al., "XNOR-NET: Imagenet Classification Using Binary Convolutional Neural Networks", <https://arxiv.org/abs/1603.05279>, 2016, pp. 1-17.

K. Hegde et al., "UCNN: Exploiting Computational Reuse in Deep Neural Networks via Weight Repetition", Proceedings of the 45th International Symposium On Computer Architecture (ISCA), 2018, pp. 1-14.

P. Guo et al., "Potluck: Cross-Application Approximate Deduplication for Computation-Intensive Mobile Applications", ACM, ASPLOS'18, 2018, pp. 271-284 (Abstract Only).

S. Han et al., "MCDNN: An Approximation-Based Execution Framework for Deep Stream Processing Under Resource Constraints", ACM, MOBISYS'16, 2016, pp. 1-14.

Y. Lu et al., "Efficient Object Detection for High Resolution Images", <https://arxiv.org/abs/1510.01257>, 2015, pp. 1-8.

Z. Meng et al., "Detecting Small Signs From Large Images", <https://www.researchgate.net/publication/317954746_Detecting_Small_Signs_from_Large_Images>, 2017, pp. 1-9.

C. Kim et al., "A Hybrid Framework Combining Background Subtraction and Deep Neural Networks for Rapid Person Detection", Journal of Big Data, 5:22, 2018, pp. 1-24.

M. Riera et al., "Computation Reuse in DNNS by Exploiting Input Similarity", 2018 ACM/IEEE 45th Annual International Symposium on Computer Architecture (ISCA), 2018, pp. 1-12.

List of IBM Patents or Patent Applications Treated as Related, Sep. 26, 2018.

* cited by examiner

OVERLAPPING CNN CACHE REUSE IN HIGH RESOLUTION AND STREAMING-BASED DEEP LEARNING INFERENCE ENGINES

BACKGROUND

The present disclosure relates to the field of image capturing devices, and specifically to image capturing devices that are sensor enabled. Still more particularly, the present disclosure relates to sensor-enabled image capturing devices that are able to label objects depicted with images generated by the sensor-enabled image capturing devices.

SUMMARY

In an embodiment of the present invention, a method optimizes Convolutional Neural Network (CNN) inference time for full resolution images. One or more processors divide a full resolution image into a plurality of partially overlapping sub-images. The processor(s) select, from the plurality of partially overlapping sub-images, a first sub-image and a second sub-image that partially overlap one another in an overlapping area. The processor(s) feed the first sub-image, including the overlapping area, into a Convolutional Neural Network (CNN) in order to create a first inference result for the first sub-image, where the CNN has been trained at a fine resolution. The processor(s) cache an inference result from the CNN for the overlapping area, and then utilize the cached inference result when inferring the second sub-image in the CNN. The processor(s) then identify a specific object in the full resolution image based on inferring the first sub-image and the second sub-image.

In an embodiment of the present invention, CNN inference time is optimized by: receiving, by one or more processors, a data D for processing by a system that utilizes a Convolutional Neural Network (CNN) to process data; separating, by one or more processors, the data D into sequentially processed overlapping data portions DP, where a first data portion DPi-1 and a second data portion DPi-2 have a common data portion CDPi-1; processing, by one or more processors, the common data portion CDPi-1 from the first data portion to form a first data portion result DPRi-1 for the first data portion DPi-1 and a common data portion result CDPRi-1 for use by the second data portion DPi-2; reusing, by one or more processors, the common data portion result CDPRi-1 in order to contribute to a second data portion result DPRi-2 for the second data portion DPi-2; and identifying, by one or more processors, a specific object in the data D based on the first data portion result DPRi-1 and the second data portion result DPRi-2.

In one or more embodiments, the method(s) described herein are performed by an execution of a computer program product.

DETAILED DESCRIPTION

Figure 1:
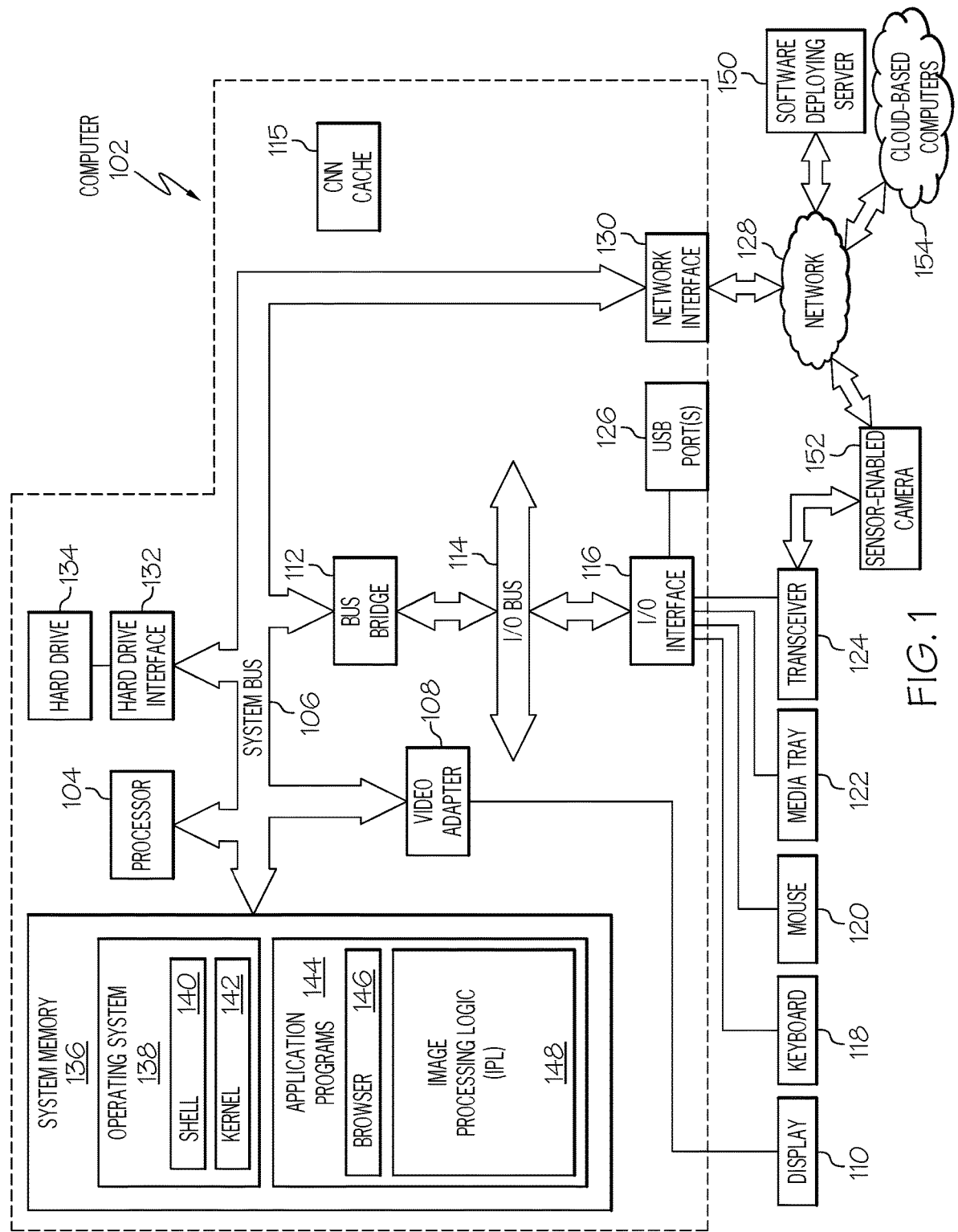
FIG. 1 depicts an exemplary system and network in which the present disclosure may be implemented.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or sensor-enabled camera 152 and/or cloud-based computers 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a transceiver 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Image Processing Logic (IPL) 148. IPL 148 includes code for implementing the processes described below, including those described in FIGS. 2-10. In one embodiment, computer 102 is able to download IPL 148 from software deploying server 150, including in an on-demand basis, wherein the code in IPL 148 is not downloaded until needed for execution. Note further that, in one embodiment of the present invention, software deploying server 150 performs all of the functions associated with the present invention (including execution of IPL 148), thus freeing computer 102 from having to use its own internal computing resources to execute IPL 148.

Figure 7:
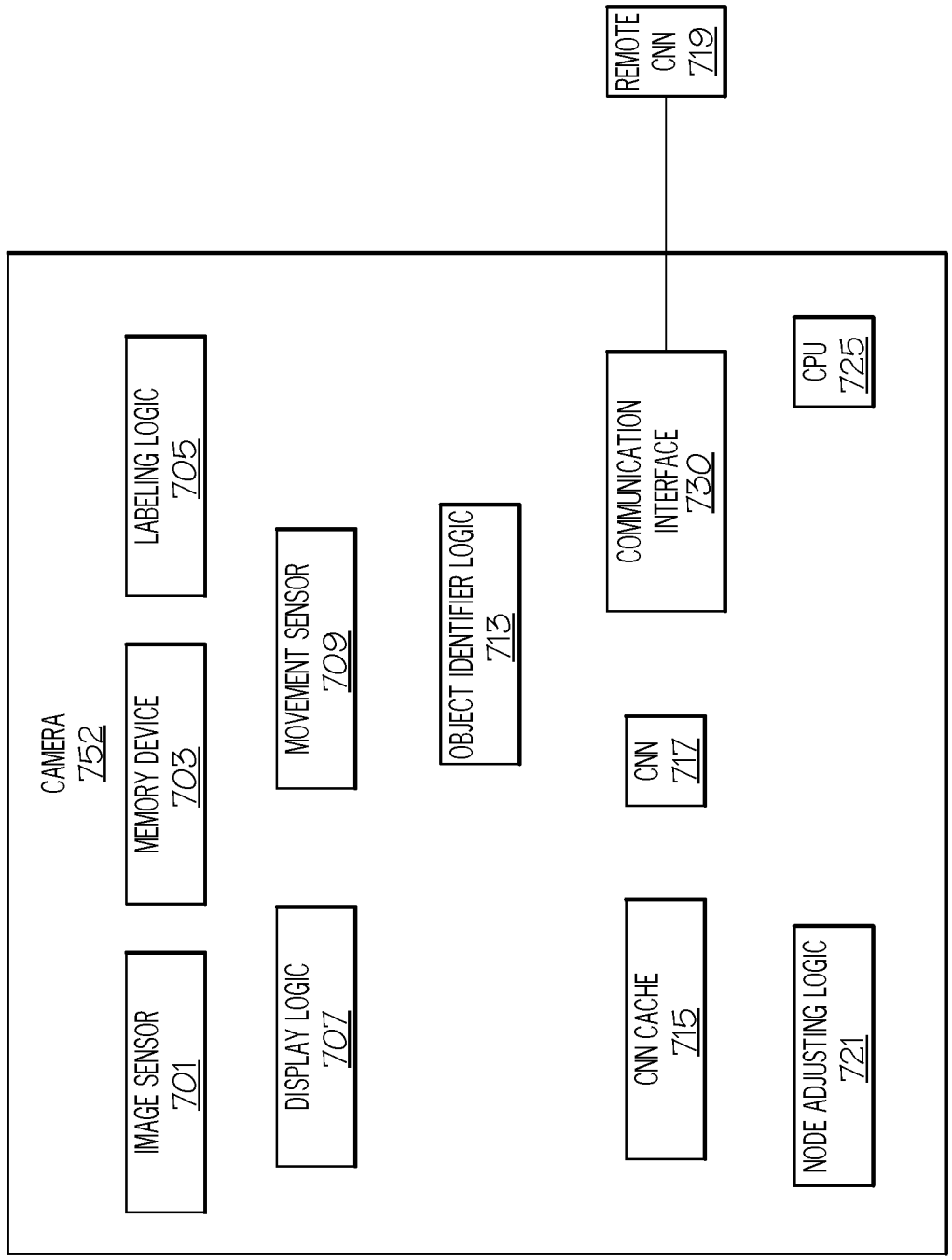
FIG. 7 illustrates details of a sensor-enabled camera utilized in one or more embodiments of the present invention.

Also within computer 102 is a Convolutional Neural Network (CNN) cache 115, which is analogous to CNN cache 715 shown in FIG. 7. CNN cache 115 caches inference results for overlapping sections of information, as described herein.

Also within computer 102 is a cache controller 103, which decides what CNN inference data is cached based on receiving a description of the overlapping area between patches in the data/photograph. Cache controller 103 also ensures cache coherency, as well as which particular cache (e.g., L2, L3, etc.) stores the CNN inference data.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Image and video processing is increasingly important to a variety of tasks, such as object detection, object/facial recognition, object segmentation, image question-answer, video question-answer, etc. Convolutional Neural Networks (CNNs) provide deep-learning architectures that achieve state-of-the-art performance on many Artificial Intelligence (AI) challenges.

However, CNN computations are expensive. That is, several billions of multiplications and additions are required to classify even low-resolution images. If such processing is performed on a cloud, then the bandwidth required to move image data to the cloud (or fog) is very high.

Figure 2:
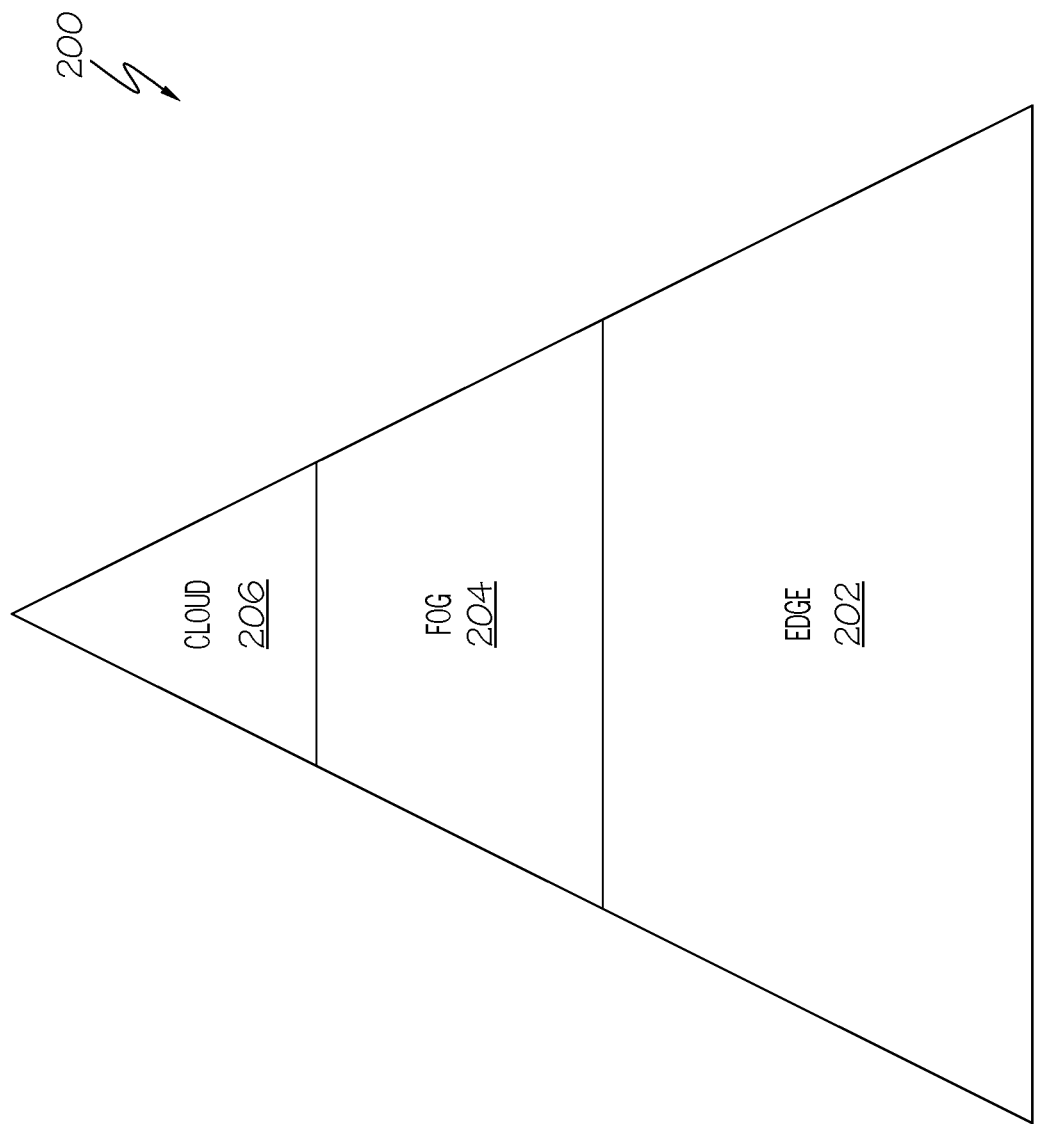
FIG. 2 depicts an overview of a hierarchy of processing abilities in a cloud-based system in accordance with one or more embodiments of the present invention.

For example, consider now FIG. 2, which depicts a pyramid graph 200 of devices that utilize cloud and/or fog resources. At the bottom of the pyramid graph 200 is an edge 202, which includes devices such as cell phones, digital cameras, client computers (i.e., laptop computers, desktop computers, etc.). As suggested by the shape of pyramid graph 200, edge 202 includes a very large number (e.g., billions) of devices. In accordance with one or more embodiments of the present invention, the edge 202 includes devices that are 1) able to capture images, but 2) have limited computing power as compared with devices found in fog 204 and/or cloud 206, where the devices found in fog 204 and/or cloud 206 are analogous to the cloud-based computers 154 shown in FIG. 1.

For example, fog 204 includes servers and other computing/storage devices that number in the millions. Fog 204 handles many, if not most, of the processing needs of the devices in edge 202. Fog 204 sends the results of its processing operations not only to the devices in edge 202, but also to data centers found in the cloud 206.

While fog 204 and/or cloud 206 have the computational power to evaluate images created by the devices in edge 202, this creates several problems. First, if the edge 202 and the fog 204 (and/or cloud 206) are required to exchange all images, data, computational results, etc., this presents a heavy burden on communication networks (which are often wireless and thus have even less bandwidth) between the edge 202 and the fog 204 (and/or cloud 206). Second, using the fog 204 and/or cloud 206 to perform all analytical calculations for captured images (e.g., for labeling objects the captured images) poses scaling problems when determining which nodes in the fog 204 and/or data centers in the cloud 206 are to be allocated to devices in the edge 202.

If the devices in the edge 202 had their own computational power to perform any type of analysis of the images they capture, then they would not need the computational resources in the fog 204 and/or the cloud 206. However, this is not the case. Rather, the devices in the edge 202 often have limited computational and/or storage capacities. Thus, one or more embodiments of the present invention solve this problem by using previously performed calculations (by the devices themselves and/or by the fog 204 and/or the cloud 206) on a captured image, particularly when the previously performed calculations are from previously-captured images.

In one or more embodiments, the present invention utilizes a Convolutional Neural Network (CNN) to analyze a video image and caches CNN-based analysis results for use with other partially overlapping captured images.

Assume now that the user/system wants to label objects in a high resolution image. However, fine-grained analysis is difficult, time consuming, and consumes high levels of resources. For example, if the system is trying to locate a small screw that is floating around in a space station, this is very challenging. First, many image processing solutions train on scaled-down images (e.g., 224×224 pixels), and thus are not fine-grained enough to "see" the small screw. Second, if the high resolution image were to be broken down into enough small units that the screw is captured in one of these small units, the time and resources required to look at all of the small units (particularly in a CNN system) is prohibitive.

In order to address problems, including the one just described, one or more embodiments of the present invention provide a novel mechanism to reduce CNN inference time for high resolution images by first breaking the high-resolution image into many small, partially overlapping images. This exploits the spatial similarity found in partially overlapping CNN inputs. CNN computations for the overlapping portions of the partially overlapping images are then cached for reuse, thus saving significant amounts of computing resources and time. This makes inference time faster, allows for fine-grained analysis, and saves energy. Thus, the present invention breaks smaller input images into sets of images with known overlap, and exploits this known overlap via caching during inference.

In one or more embodiments of the present invention, a Convolutional Neural Network (CNN) is utilized to 1) analyze the images, data, photograph(s), etc.; and 2) determine which cached analysis results are to be reused. This leads to insignificant computational workloads compared to previous approaches.

As just mentioned, one or more embodiments of the present invention utilize a Convolutional Neural Network (CNN). As the name implies, a CNN utilizes logic similar to that of a Traditional Neural Network (TNN), but with several significant differences. Before discussing these differences, a description of neurons used in any type of neural network is now presented.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected other biological neurons.

An electronic neural network similarly is made up of electronic neurons. However, unlike biological neurons, electronic neurons are never technically "inhibitory", but are only "excitatory" to varying degrees.

In a TNN, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

A CNN is similar to a TNN in that both utilize interconnected electronic neurons. However, a CNN is different from a TNN in that 1) a CNN has neural layers whose sizes are based on filter sizes, stride values, padding values, etc. (see FIG. 3) and 2) utilize a convolution scheme to analyze image data (see FIG. 4). A CNN gets its "convolutional" name based on a convolution (i.e., a mathematical operation on two functions to obtain a result) of filtering and pooling pixel data (a mathematical operation on two functions) in order to generate a predicted output (obtain a result).

Figure 3:
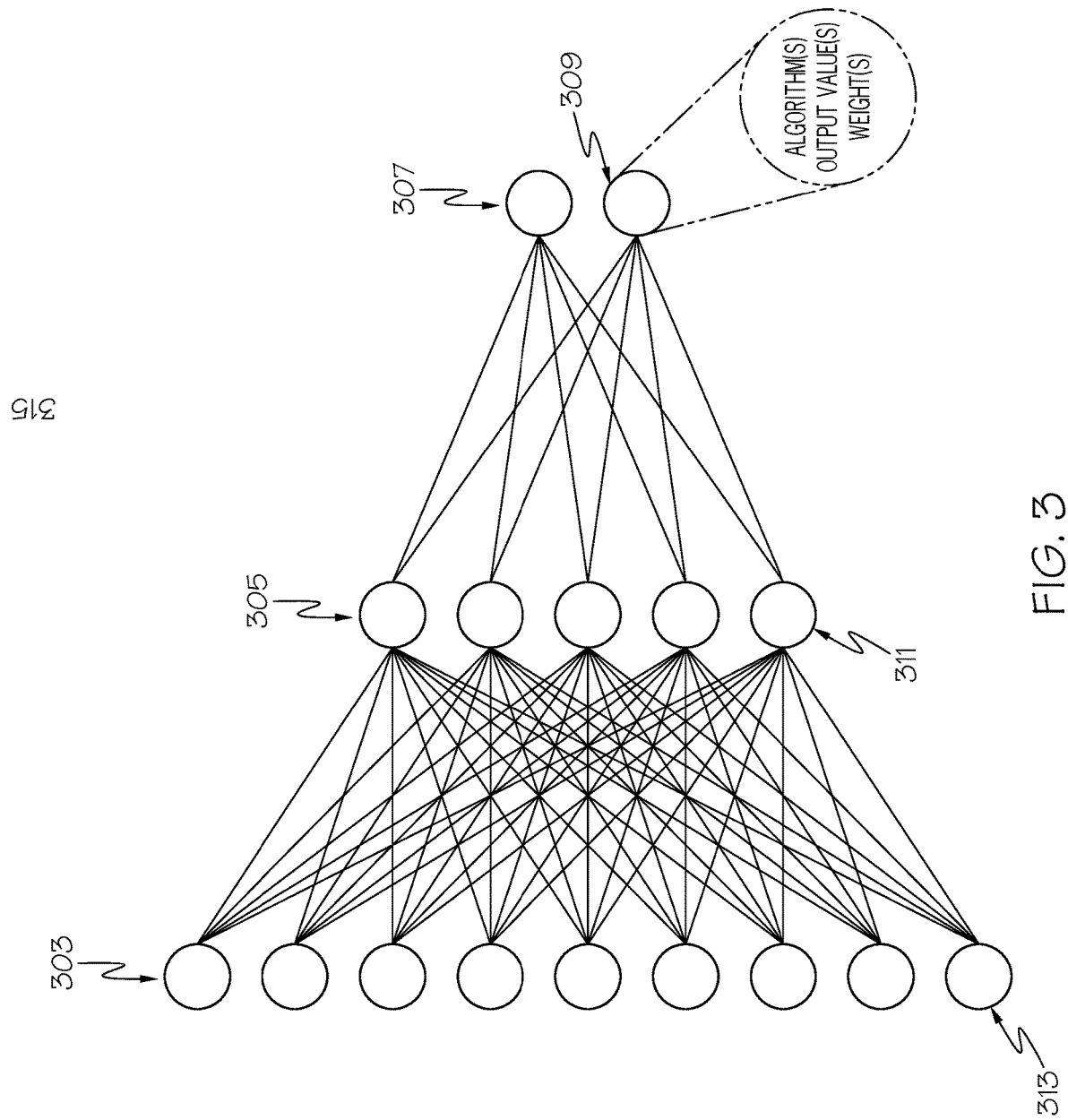
FIG. 3 illustrates an exemplary Convolutional Neural Network (CNN) as used in one or more embodiments of the present disclosure.

With reference now to FIG. 3, an exemplary component of a CNN 301 is presented. Each depicted node in FIG. 3 represents a neuron (i.e., an electronic neuron). In accordance with one or more embodiments of the present invention, an input layer 303 includes neurons that receive data that describes pixels from a photograph. Rather than being connected to an equal number of neurons (as in a TNN), the neurons from the input layer 303 of the CNN 301 connect to a fewer number of neurons in a middle layer 305, which connect to an even fewer number of neurons in the output layer 307. However, it is not necessarily always the case that the number of neurons in subsequent layers in the CNN 301 are decreased. For example, CNN 301 can have a middle layer 305 that is the same size as the input layer 303, or can have a middle layer 305 that is larger than the size of the input layer 303, depending on how the CNN 301 is designed. More specifically, for a given convolutional layer and/or pooling layer, the filter size, the stride value, and the padding (e.g., weight) value of the neuron(s) determine the size of the next layer. While a standard CNN has convolutional layers and pooling layers, some variants of CNN have other types of layers like deconvolution layers and upsampling layers. Those generally increase the size of the following layer.

As just mentioned, each node in the depicted CNN 301 represents an electronic neuron, such as the depicted neuron 309. As shown in block 315, each neuron (including neuron 309) functionally includes at least three features: an algorithm, an output value, and a weight.

The algorithm is a mathematic formula for processing data from one or more upstream neurons. For example, assume that one or more of the neurons depicted in the middle layer 305 send data values to neuron 309. Neuron 309 then processes these data values by executing the algorithm shown in block 315, in order to create one or more output values, which are then sent to another (not shown) neuron or another device. Each neuron also has a weight, that is specific for that neuron and/or for other connected neurons.

For example, assume that neuron 313 is sending the results of its analysis of a piece of data to neuron 311. Neuron 311 has a first weight that defines how important data coming specifically from neuron 313 is. If the data is important, then data coming from neuron 313 is weighted heavily, thus causing the algorithm(s) within neuron 311 to generate a higher output, which will have a heavier impact on neurons in the output layer 307. Similarly, if neuron 311 has been determined to be significant to the operations of neuron 309, then the weight in neuron 311 will be increased, such that neuron 309 receives a higher value for the output of the algorithm in the neuron 311. These weights are adjustable for one, more, or all of the neurons in the CNN 301, such that a reliable output will result from output layer 307. Such adjustments may be performed manually or automatically.

When manually adjusted, the weights are adjusted by the user, sensor logic, etc. in a repeated manner until the output from output layer 307 matches expectations. For example, assume that input layer 303 receives pixel values (color, intensity, shading, etc.) from pixels in a photograph of a dog. If the output from output layer 307 is a vector that is predetermined to describe a dog (e.g., (1,2,4,10)), then the weights (and alternatively the algorithms) are adjusted until the vector (1,2,4,10), or a vector that is mathematically similar, is output from output layer 307 when pixel data from a photograph of a dog is input into input layer 303.

When automatically adjusted, the weights (and/or algorithms) are adjusted using "back propagation", in which weight values of the neurons are adjusted by using a "gradient descent" method that determines which direction each weight value should be adjusted to. This gradient descent process moves the weight in each neuron in a certain direction until the output from output layer 307 improves (e.g., gets closer to (1,2,4,10)).

Figure 4:
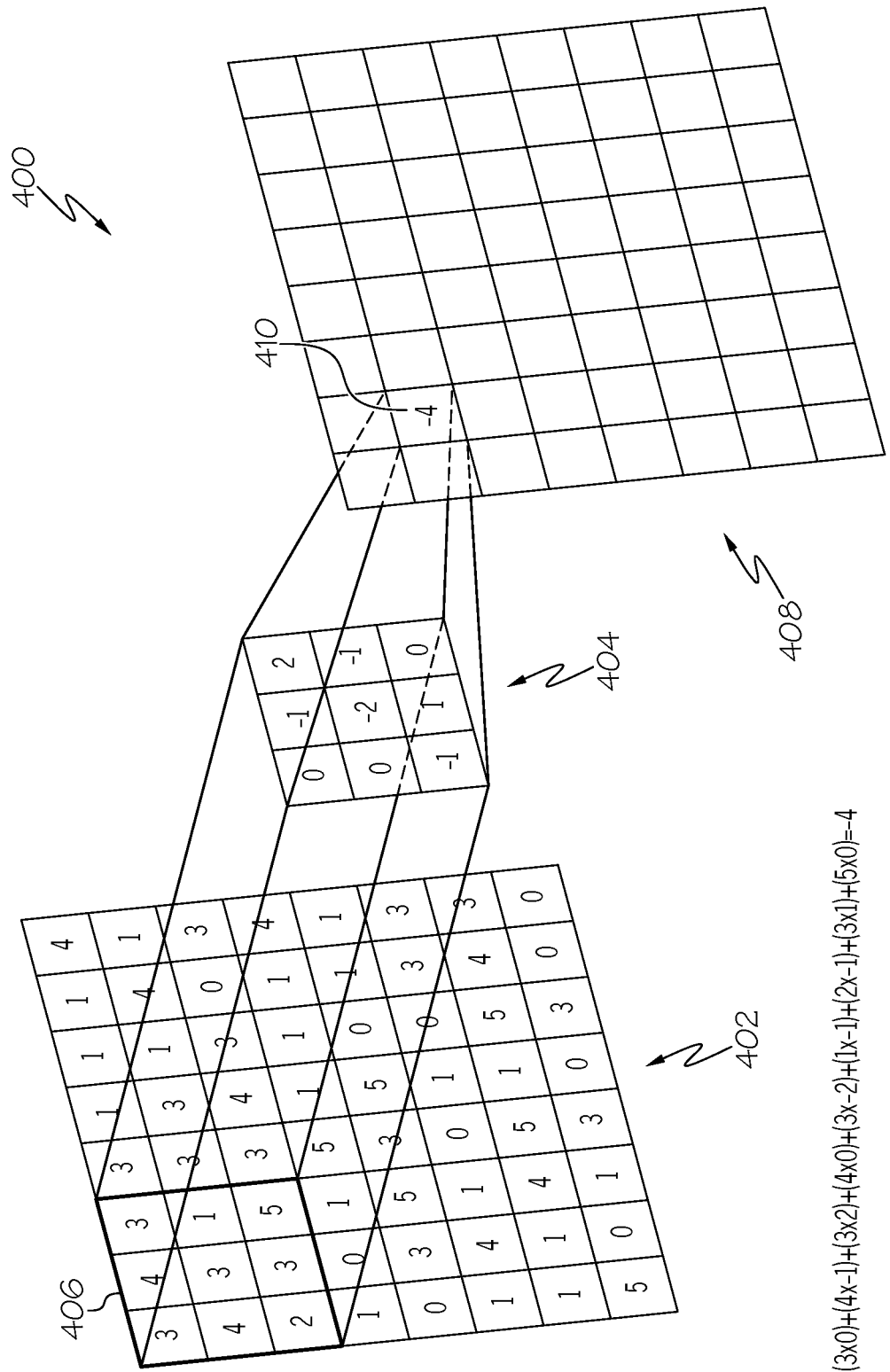
FIG. 4 depicts additional functionality detail of the CNN illustrated in FIG. 3.
Figure 5:
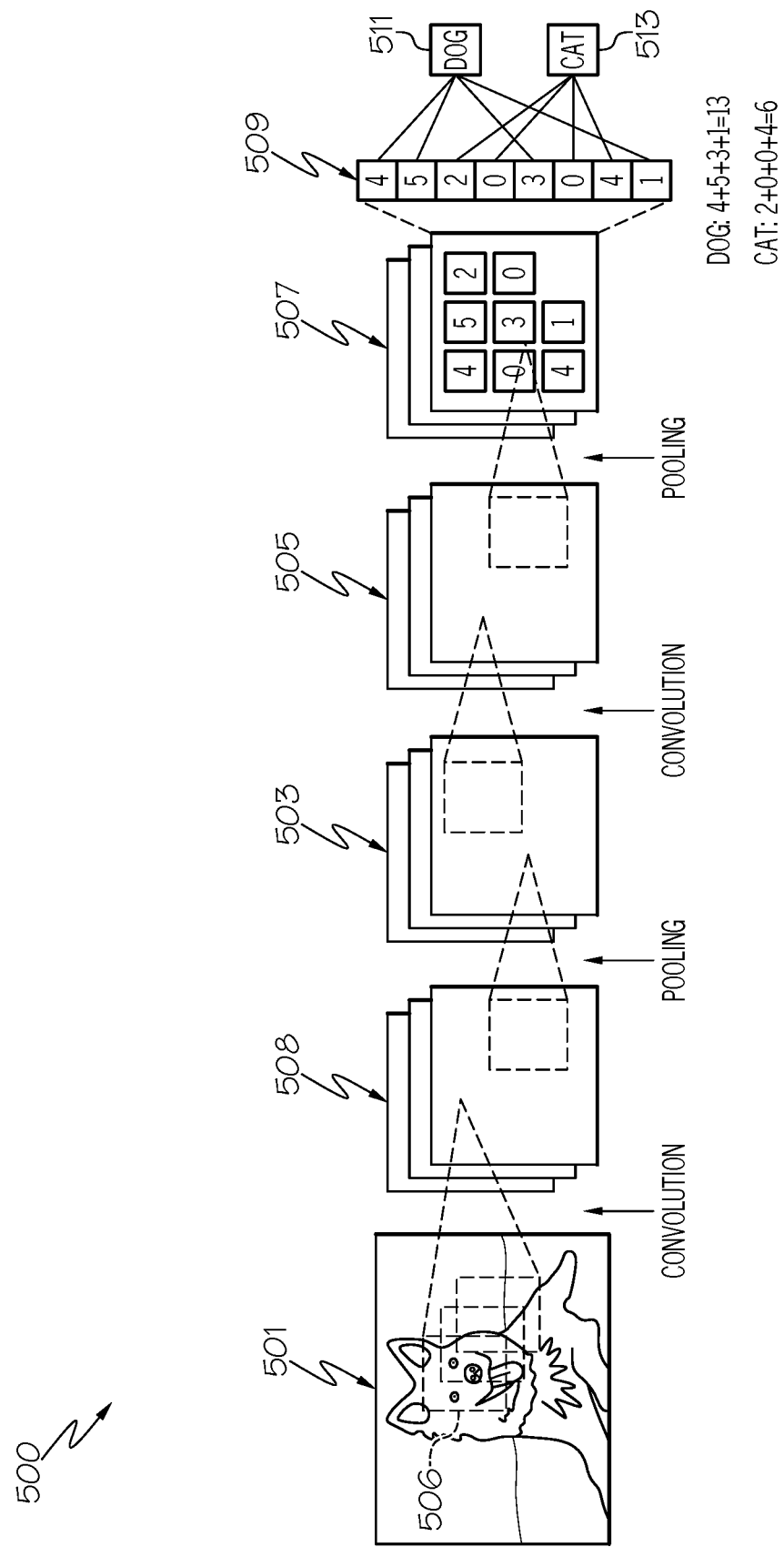
FIG. 5 illustrates an exemplary photo image being evaluated/inferred using the CNN in accordance with one or more embodiments of the present invention.

As described herein, a CNN process includes 1) a convolution stage (depicted in FIG. 4), followed by a 2) pooling stage and a classification stage (depicted in FIG. 5).

With reference now to FIG. 4, a convolution/pooling scheme to analyze image data is presented in CNN convolution process 400. As shown in FIG. 4, pixel data from a photographic image populates an input table 402. Each cell in the input table 402 represents a value of a pixel in the photograph. This value is based on the color and intensity for each pixel. A subset of pixels from the input table 402 is associated with a filter 404. That is, filter 404 is matched to a same-sized subset of pixels (e.g., pixel subset 406) by sliding the filter 404 across the input table 402. The filter 404 slides across the input grid at some predefined stride (i.e., one or more pixels). Thus, if the stride is "1", then the filter 404 slides over in increments of one (column) of pixels. In the example shown in FIG. 4, this results in the filter 404 sliding over the subset of pixels shown as pixel subset 406 (3,4,3,4,3,1,2,3,5 when read from left to right for each row) followed by filter 404 sliding over the subset of pixels just to the right (4,3,3,3,1,3,2,5,3). If the stride were "2", then the next subset of pixels that filter 404 would slide to would be (3,3,1,1,3,3,5,3,4).

Filter 404 is applied against each pixel subset using a mathematical formula. That is, the values in the filter 404 are added to, subtracted from, multiplied by, divided by, or otherwise used in a mathematical operation and/or algorithm with the values in each subset of pixels. For example, assume that the values in filter 404 are multiplied against the pixel values shown in pixel subset 406 ((3×0)+(4×−1)+(3×2)+(4×0)+(3×−2)+(1×−1)+(2×−1)+(3×1)+(5×0)) to arrive at the value of −4. This value is then used to populate feature map 408 with the value of −4 in cell 410.

In a preferred embodiment, the convolution step also includes use of an activation function, which transforms the output of the convolution operation into another value. One purpose of the use of an activation function is to create nonlinearity in the CNN. A choice of specific activation function depends on an embodiment. Popular choices of an activation function include a rectified linear unit (ReLU), a leaky ReLU, a sigmoid function, a tan h function, and so on.

In an embodiment, each subset of pixels uses a same filter. However, in a preferred embodiment, the filter used by each subset of pixels is different, thus allowing a finer level of granularity in creating the feature map.

With reference now to FIG. 5, the pooling stage and a classification stage (as well as the convolution stage) of a CNN 500 during inference processing is depicted. That is, once the CNN is optimized by adjusting weights and/or algorithms in the neurons (see FIG. 3), by adjusting the stride of movement of the pixel subset 406 (see FIG. 4), and/or by adjusting the filter 404 shown in FIG. 4, then it is trusted to be able to recognize similar objects in similar photographs. This optimized CNN is then used to infer (hence the name inference processing) that the object in a new photograph is the same object that the CNN has been trained to recognize.

As shown in FIG. 5, assume that pixels from a photograph 501 are used as inputs to the input table 402 shown in FIG. 4, using a CNN that has been previously defined and optimized to recognize the image of a dog. Assume further that a series of pixel subsets, including the pixel subset 506 (analogous to pixel subset 406 shown in FIG. 4) are convolved (using the process described in FIG. 4), thus resulting in a set of feature maps 508 (analogous to feature map 408 shown in FIG. 4). Once the feature maps 508 are generated, they are pooled into smaller pooled tables 503, in order to reduce the dimensionality of the values, thereby reducing the number of parameters and computations required in the CNN process. Once these pooled tables 503 are created, they themselves are then convoluted to create new (and even more compressed) feature maps 505, which are then pooled to create even more compressed pooled tables 507.

The pooled tables 507 (which in an embodiment is actually a single table) are "unrolled" to form a linear vector, shown in FIG. 5 as a fully connected layer 509. Fully connected layer 509 is connected to prediction output, including prediction output 511 (for a dog) and prediction output 513 (for a cat).

For example, assume that for a prediction output to be considered accurate, it must have an arbitrarily chosen total value of 10 or greater for the sum of values from cells in the fully connected layer 509 to which it is connected. As such, the prediction output 511 is connected to cells in the fully connected layer 509 that have the values of 4, 5, 3, and 1, resulting in a sum total of 13. Thus, the CNN 500 concludes that photograph 501 includes an image of a dog. In one or more embodiments, an output function, such as a softmax function, amplifies larger output values, attenuates smaller output values, and normalizes all output values in order to ensure that their total sum is one. That is, rather than assigning an arbitrary number (e.g., 10) as being what the sum total of values in certain cells from the connected layer 509 must exceed in order to indicate that a particular entity (e.g., a dog) is portrayed in the new photograph, an output function such as a softmax function dynamically adjusts the output values and then normalizes them, such that they sum up to 1.0 or some other predetermined number. Thus, while the described values shown in FIG. 5 describe the concept of output values describing entities in the photographs, in practice a static threshold value is not used in certain embodiments. Rather, in this alternative/preferred embodiment, the system utilizes a normalized summation (as just described), in order to further control the output characteristics, thus more accurately determining the label of the object in the photograph.

The prediction output 513 for a cat is only 6 (2+0+0+4) based on the cells in the fully connected layer 509 to which it is attached. However, if the pixels in the photograph 501 were of a cat, then the fully connected layer 509 (if properly trained) would result in the values of the cells in the fully connected layer 509 that are connected to the prediction output 511 to total less than 10, while the values of the cells in the fully connected layer 509 that are connected to the prediction output 513 would be more than 10.

As discussed above with regard to FIG. 5, inference is the process of using a trained CNN to recognize certain objects from a photograph or other data. In the example in FIG. 5, pixels from photograph 501 are input into a trained CNN (e.g., CNN 500), resulting in the identification and/or labeling (for display on the photograph 501) a particular object, such as the dog.

That is, a CNN is trained to recognize a certain object (e.g., a dog in a photograph). By using a new photograph as an input to the trained CNN, a dog in the new photograph is also identified/labeled using a process known as inferencing. This inferencing occurs in real time, and recognizes specific objects (e.g., a dog) by running the new photograph through the trained CNN.

Figure 6:
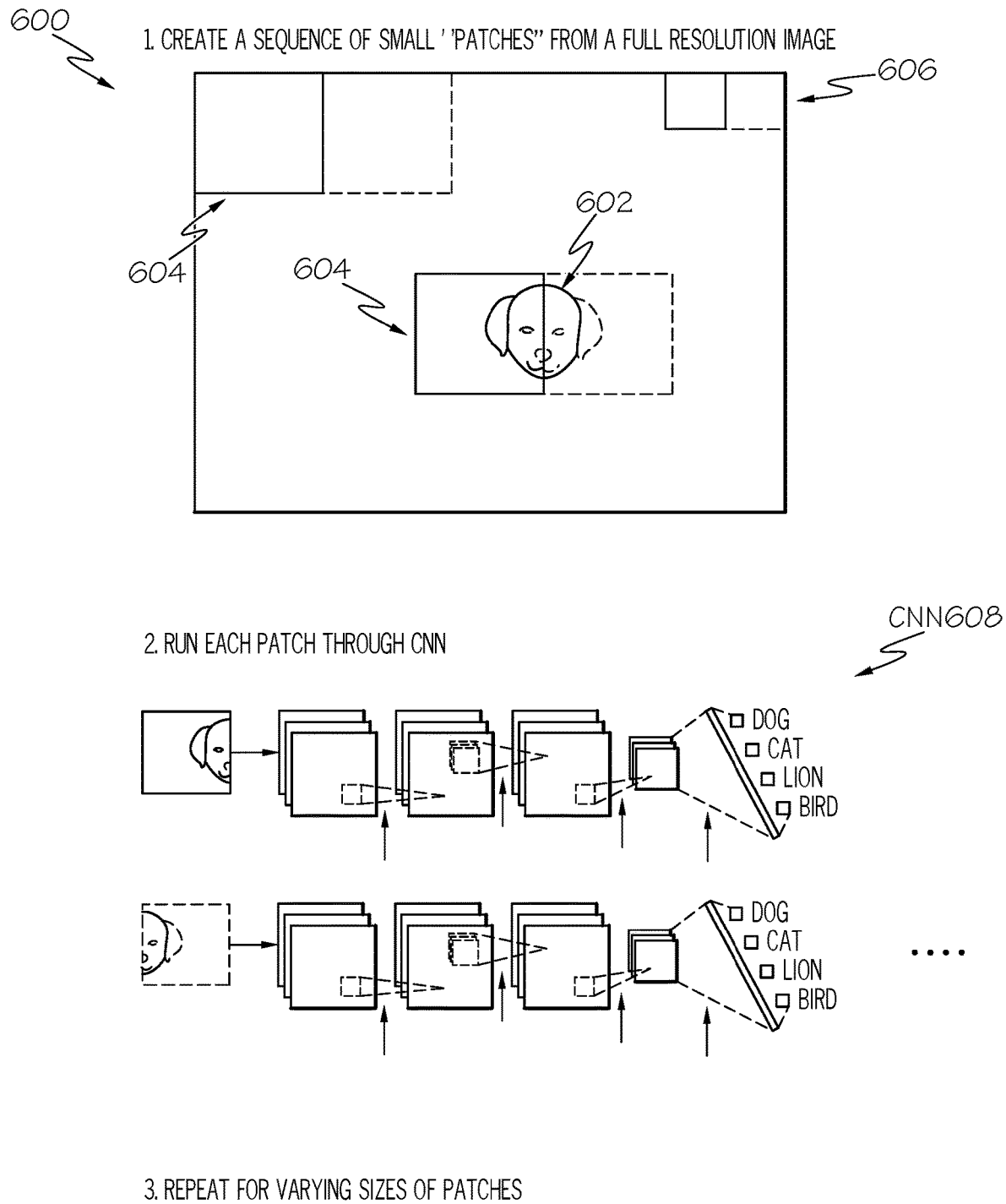
FIG. 6 depicts an exemplary patching of an image.

As shown in FIG. 6, assume that a full resolution image 600 has been taken by a camera, such as camera 752 described in FIG. 7.

With reference to FIG. 7, details of one or more features of an exemplary camera 752 (analogous to camera 152 shown in FIG. 1) as used to capture a full resolution image 600 in accordance with one or more embodiments of the present invention is presented.

Image sensor 701 is an optic sensor (e.g., a Complementary Metal-Oxide-Semiconductor-CMOS) that converts light into an electronic signal, which is then sent to a memory device 703 (e.g., a memory card).

Labeling logic 705 is a hardware circuit that converts an output from an algorithm (e.g., using CNN) into a text label. For example, and in one embodiment, labeling logic takes the array (4,5,3,1,) shown in FIG. 5 as an input, and outputs a label "DOG", which can be overlaid onto a digital image using display logic 707. In another embodiment, labeling logic 705 is executed software that performs this function.

Movement sensor 709 is a sensor that detects movement of the camera 752. In an embodiment of the present invention, movement sensor 709 is a self-contained unit, such as an accelerometer. In another embodiment, movement sensor 709 uses inputs from an external device (not shown), such as a gear or wheel. That is if camera 752 is mounted on a track, and the movement of camera 752 along the track is causes by gears/wheels in a mechanical device turning (thus propelling the camera), sensor readings describing the movement of such gears/wheels accurately describe the movement of the camera 752.

The object identifier logic 713 is logic (e.g., the CNN logic 717 or an abbreviated version of the CNN logic 717 described herein) used to identify an object within a photograph. In an embodiment, if the camera 752 has sufficient processing power to run a full version of the CNN, then it will do so. However, if the camera 752 has insufficient processing power to run a full version of the CNN, then a limited version (e.g., in which only one convolution/pooling operation is performed, in which only a limited number of prediction outputs is supported, etc.) is performed. In another embodiment, if camera 752 has insufficient processing power to run CNN 717, then a communication interface 730 will connect the camera 752 to a remote CNN 719, which runs on a remote server/computer (not shown).

Node adjusting logic 721 is logic that adjusts weights and/or algorithms in the CNN using regressive analysis. That is, node adjusting logic 721 is a processor that has been preconfigured to determine the accuracy of the predicted outputs (as shown in the example of FIG. 5), and then adjust the weight and/or algorithm in the neurons in the CNN (see FIG. 3) until the prediction outputs accurately describe the photographed object. This process of node adjusting is preferably performed by back propagation, which reiteratively adjusts the weights/algorithm and/or bias (an offset value that adjusts the total activation level of the neuron). In another embodiment, the node adjusting logic 721 is executed software, in which the node adjusting is performed using software that directly adjusts the neurons' weights/algorithms/biases.

In an embodiment of the present invention, the functions performed by one or more of labeling logic 705, display logic 707, object identifier logic 713, CNN 717, and node adjusting logic 721 are performed by an on-board Central Processing Unit (CPU) 725 executing some or all of the instructions found in IPL 148 shown in FIG. 1.

With reference again to FIG. 6, assume for illustrative purposes that camera 752 has captured a full resolution image 600. Assume further that full resolution image 600 includes images of many objects (not depicted), such as trees, buildings, other animals, etc. However, the system is trying to identify and label the dog 602 depicted in the full resolution image 600.

In order to identify the dog 602 through the process of inference (in which the full resolution image is input into a trained CNN that can identify dogs in photographs), the system first creates a sequence of small "patches" from the full resolution image 600. These patches are uniform in size, although different sized patches may be used on different iterations of the inference process. That is, patches 604 are larger than patches 606. However, when using patches 604, these larger patches 604 are used to create uniform sized segments for the entire full resolution image 600. When using patches 606, these smaller patches 606 are used to create uniform sized segments for the entire full resolution image 600.

When addressing larger patches and smaller patches, each patch can be as small as the native input size of the CNN model to be used. For example, assume that the CNN is designed to take a 200×200 input, and that whole image size is 2000×2000. Thus, the CNN model can use variable-sized patches as small as 200×200, and as large as 2000×2000. For the patches sized bigger than 200×200, those are downsampled (i.e., a portion of the inputs are selected) to match the CNN input size of 200×200.

Thus, in order to detect a very small object, a patch should not be downsampled, and small-sized patches are used in order to preserve every pixel, since a small patch is able to enclose such a small object.

However, in order to detect a large object, a patch should cover a sufficiently large image area to enclose such a large object. For example, if an object is sized roughly a quarter of the entire image, a patch to enclose such an object should be at least 1000×1000 large. But such a big patch exceeds the input size of CNN. As such, the patch is downsampled to match the size of CNN.

Thus, the larger patches 604 are run through a trained CNN 608 in order to identify a larger object such as all of the dog 602 (using the inference process described herein), and then the smaller patches 606 are run through the trained CNN 608 in order to identify/infer the presence of a smaller object (e.g., just the nose of the dog 602).

However, note that a problem has arisen when using only the larger patches 604. Specifically, detection of just the nose of the dog 602 is missed since just the nose of dog does not fully appear in any of the larger patches 604. Furthermore, if the smaller patches 606 had been used, they are too small to fully capture the image of the entire dog 602.

Figure 8:
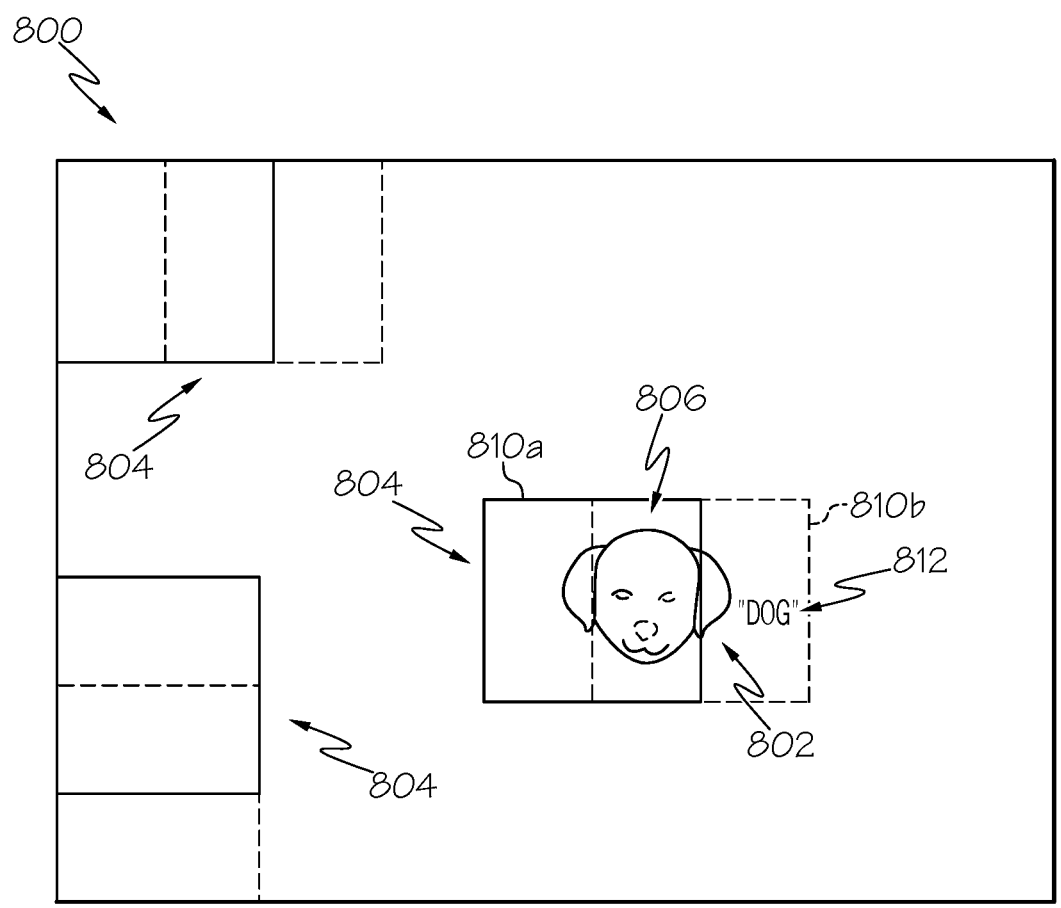
FIG. 8 depicts an exemplary patching overlap as used in one or more embodiments of the present invention.

In order to address this problem, the present invention utilizes partially overlapping patches, such as shown in FIG. 8. Assume that a full resolution image 800 (analogous to the full resolution image 600 shown in FIG. 6) includes an image of a dog 802 (analogous to the dog 602 shown in FIG. 6). Assume further that the full resolution image 800 has been fully partitioned using larger patches 804 (analogous to the larger patches 604 shown in FIG. 6). However, unlike the patches 604 shown in FIG. 6, patch 810a and patch 810b (examples of the patches 804) shown in FIG. 8 partially overlap. This partial overlap 1) ensures that the image of the dog 602 is captured by associating the overlapping area 806 with both of the partially overlapping patches 810a/810b; and 2) allows the inference processing of overlapping area 806 during the inference processing of the patch 810a to be cached and reused during the inference processing of patch 810b.

Figure 9:
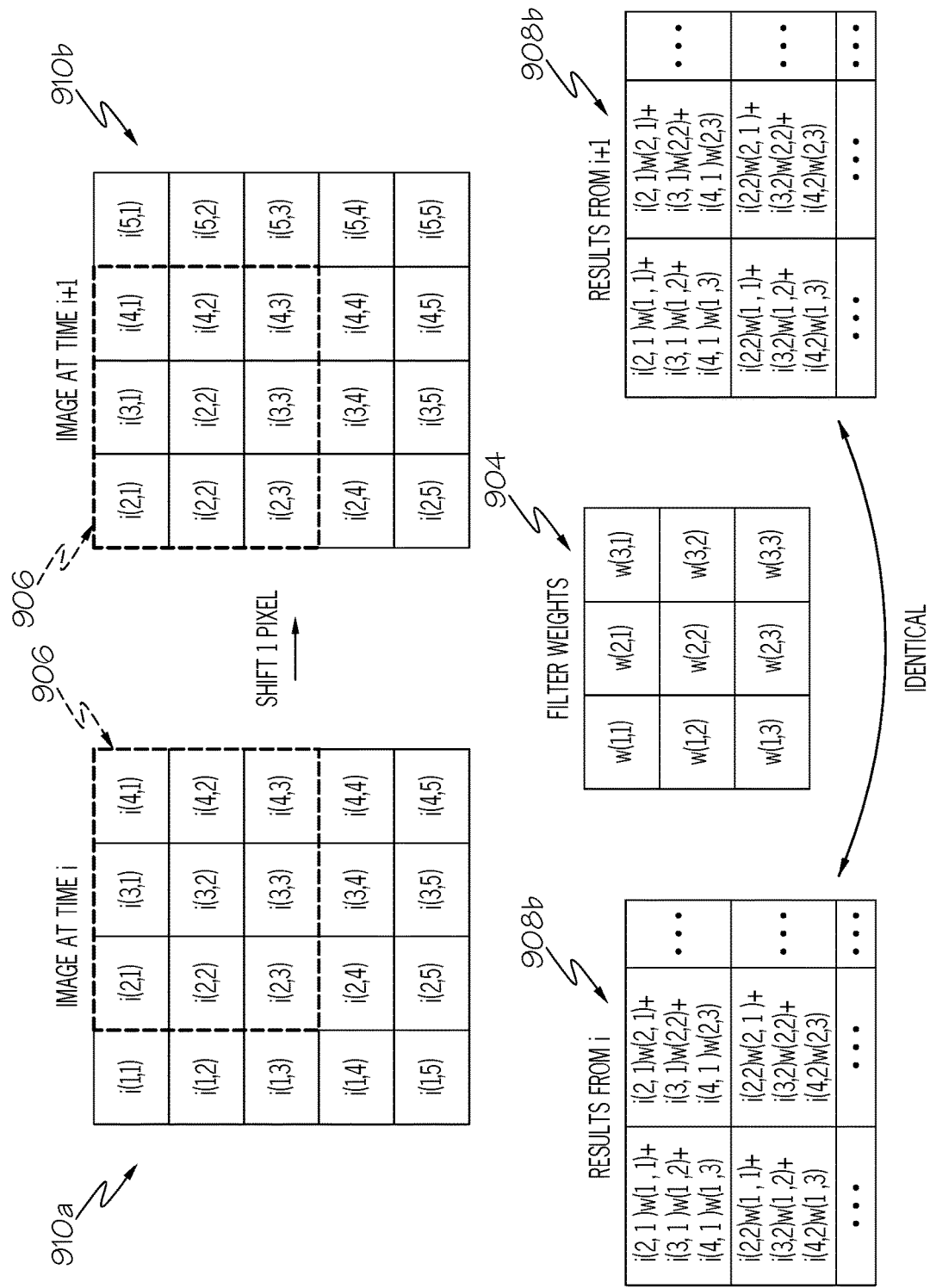
FIG. 9 illustrates a reusable patching overlap as used in one or more embodiments of the present invention.

For example, as shown in FIG. 9, patch 910a (analogous to patch 810a shown in FIG. 8) has captured a set of pixel data, including that found in overlapping area 906 (analogous to overlapping area 806 shown in FIG. 8). Assuming that there is a one-pixel shift between patch 910a and patch 910b (analogous to patch 810b shown in FIG. 8), the information found in overlapping area 906 is the same for patch 910a and patch 910b. As such, the same filter weights 904 (analogous to filter 404 shown in FIG. 4) creates the same results 908a/908b (analogous to entries in the feature map 408 shown in FIG. 4). Thus, the results 908a calculated by the CNN 400 (shown in FIG. 4) for overlapping area 906 in patch 910a are cached for reuse by patch 910b, thus reducing inference processing overhead for patch 910b.

While the example above shows the present invention being used with a camera that has captured a live scene, one or more embodiments of the present invention take an input of an image previously taken elsewhere, and perform the processes just described (i.e., dividing the image into smaller patches, applying each patch to a CNN, aggregate the small results, etc.).

Figure 10:
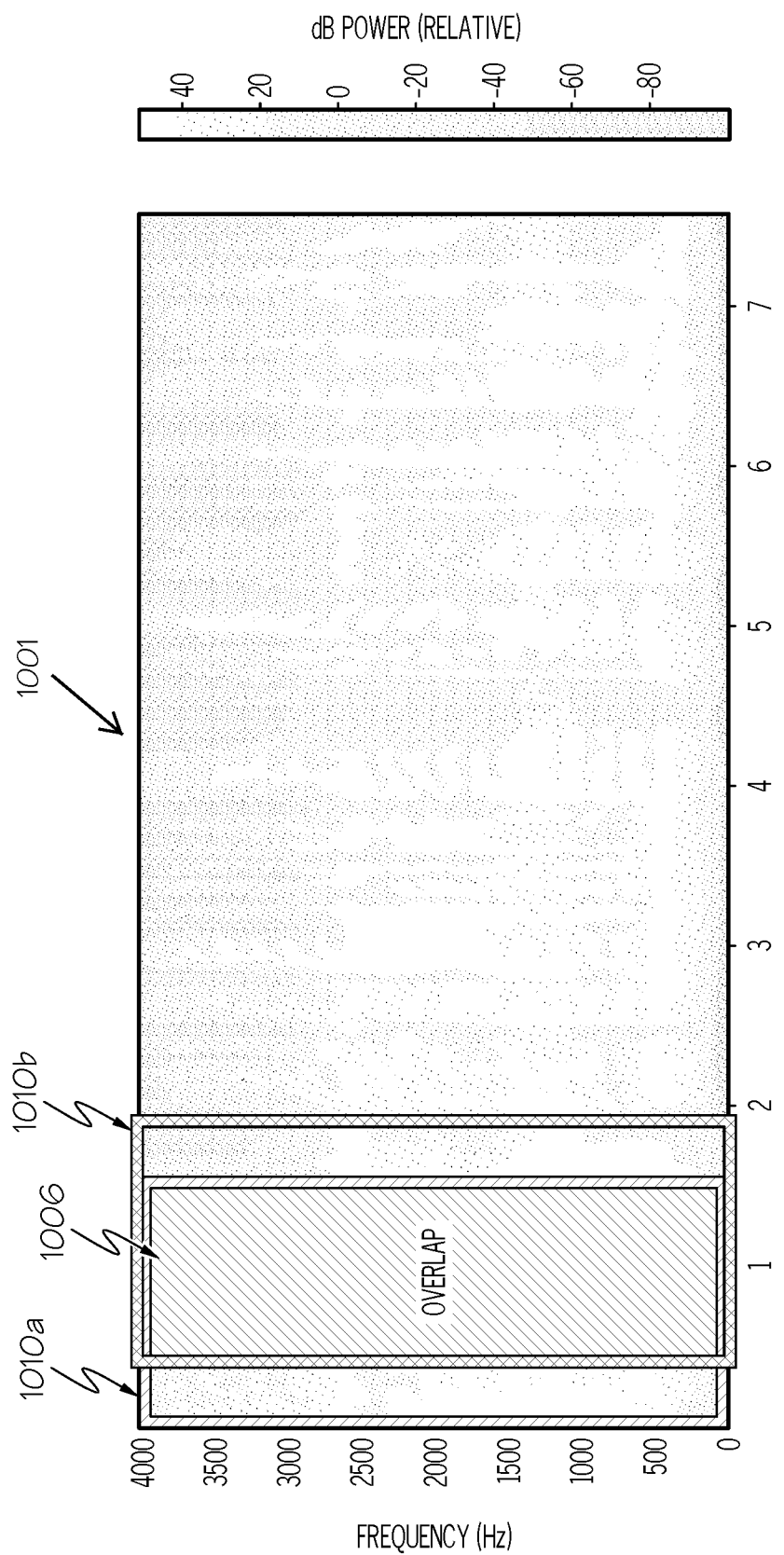
FIG. 10 illustrates an exemplary sound graph that is processed using one or more embodiments of the present invention.

While the present invention has been described thus far as being utilized in the CNN inference process for a photograph, the partial overlapping of patches described for photographs (see FIG. 8) is also appropriate for use with other data, such as the graph 1001 shown in FIG. 10. Graph 1001 is a graph of sound recordings, electronic transmissions, etc. More specifically, graph 1101 is a spectrogram. In one or more embodiments, such a spectrogram has a time axis (e.g., the horizontal time axis shown in graph 1001) and a frequency axis (e.g., the vertical frequency axis in graph 1001). Visual codings (e.g., color, shading, etc.) within graph 1001 indicate the intensity of the signal at each time and frequency. In essence, a spectrogram such as graph 1001 visualizes a time-varying frequency spectrum in a 2D image format. Thus, in an embodiment of the present invention, the novel CNN described herein is applied to the graph 1001 using a sliding window (e.g., patch 1010a and patch 1010b) over the spectrogram (graph 1001) obtained from a speech. Thus, the present invention accelerates accelerate speech recognition using the process(es) described herein.

As with patch 810a and patch 810b shown in FIG. 8, analogous patch 1010a and patch 1010b partially overlap in overlapping area 1006 (analogous to overlapping area 806 shown in FIG. 8). Thus, when inference processing is performed for patch 1010a, the results of the inference processing for overlapping area 1006 is cached and reused in the inference processing performed for patch 1010b.

Figure 11:
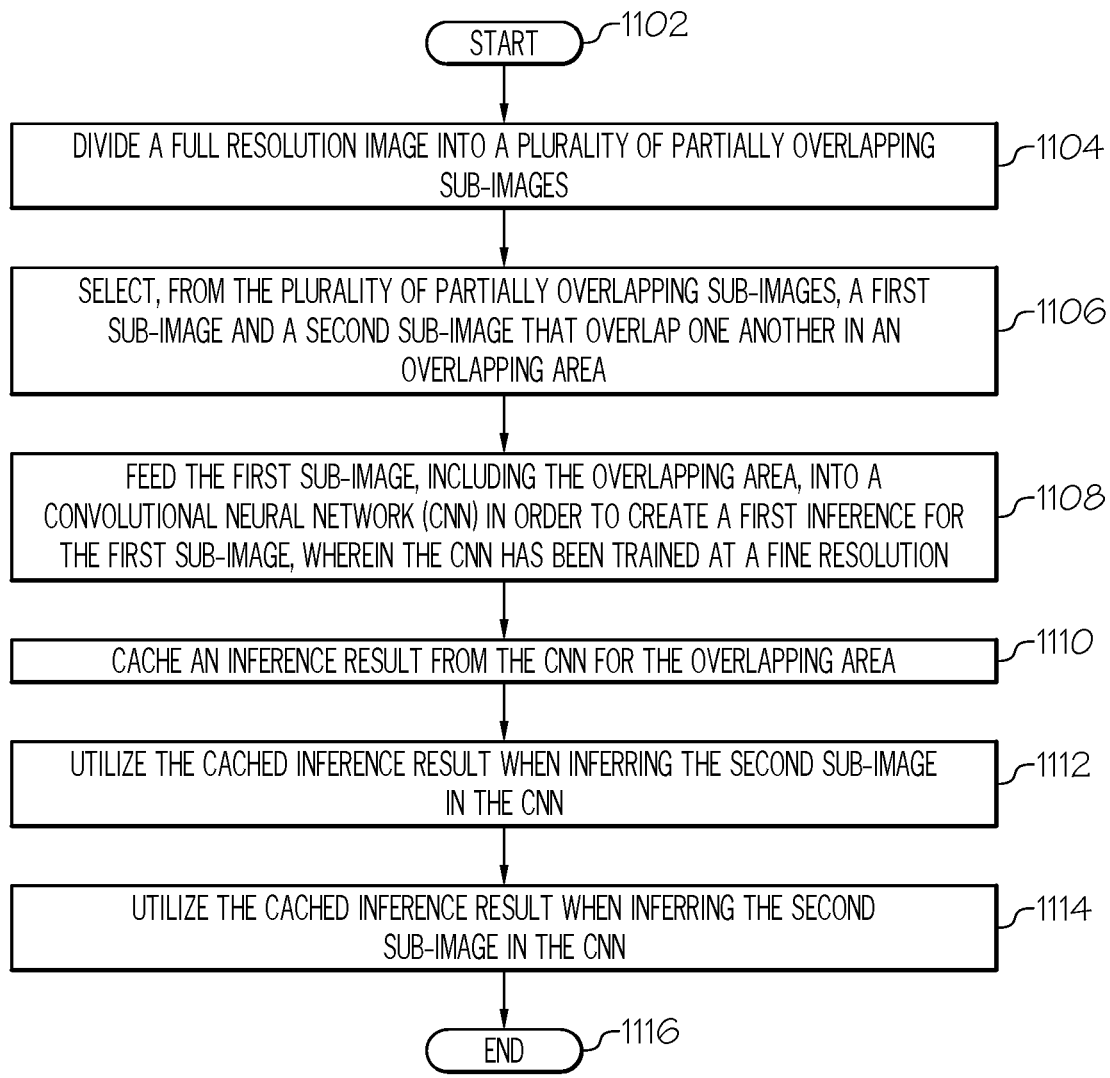
FIG. 11 is a high-level flow chart of one or more steps performed in accordance with one or more embodiments of the present invention.

With reference now to FIG. 11, a high level flow chart of one or more operations performed by one or more processors to optimize Convolutional Neural Network (CNN) inference time for full resolution images in accordance with one or more embodiments of the present invention is presented.

After initiator block 1102, one or more processors (e.g., processor 104 shown in FIG. 1) divide a full resolution image into a plurality of partially overlapping sub-images, as shown in block 1104. (See also FIG. 8.)

As described in block 1106, the processor(s) select, from the plurality of partially overlapping sub-images, a first sub-image (e.g., patch 810a shown in FIG. 8) and a second sub-image (e.g., patch 810b shown in FIG. 8) that partially overlap one another in an overlapping area (e.g., overlapping area 806 shown in FIG. 8).

As described in block 1108, the processor(s) feed the first sub-image, including the overlapping area, into a Convolutional Neural Network (CNN) (e.g., CNN 500 shown in FIG. 5) in order to create a first inference result for the first sub-image. In one or more embodiments of the present invention, the CNN has been trained at a fine resolution. That is, the CNN has been trained to recognize objects at a high resolution level that uses high resolution inputs in order to identify a certain object.

As described in block 1110, the processor(s) cache (e.g., in the CNN cache 115 shown in FIG. 1 and/or in the CNN cache 715 shown in FIG. 7) an inference result from the CNN for the overlapping area. That is, when the overlapping area (e.g., overlapping area 806 shown in FIG. 8) is inferenced for the patch 810a (processed by the CNN), this inferenced information is cached in the CNN cache.

As described in block 1112, the processor(s) then utilize the cached inference result when inferring the second sub-image (e.g., patch 810b shown in FIG. 8) in the CNN.

As described in block 1114, the processor(s) then identify a specific object (e.g., the dog 802 shown in FIG. 8) in the full resolution image based on inferring the first sub-image and the second sub-image (while using the cached inference result in the inference process for the second sub-image). In one or more embodiments, the specific object is identified by combining the inference results for both the first sub-image and the second sub-image. That is, any two sub-images that share an overlapping area are logically connected, such that whatever entity/object is represented by the combination of the two sub-images is identified during the inference process.

The flow-chart ends at terminator block 1116.

In an embodiment of the present invention, the processor(s) label the specific object within the second sub-image on a display of the full resolution image based on the CNN computation of the second sub-image (see FIG. 8).

In an embodiment of the present invention, the full resolution image is a stream. For example, if the full resolution image is photographic, then the stream is a stream of images. As such, the inference (that identifies the specific object) will follow each subsequent frame in the stream of images.

In an embodiment of the present invention, the full resolution image is a photograph of a physical scene (see FIG. 8).

In an embodiment of the present invention, the full resolution image is a graph of a stream of sound (see FIG. 10).

In an embodiment of the present invention, the full resolution image is a graph of electronic signal transmissions. That is, the graph 1001 shown in FIG. 10 may be of speech or other sound, or it may be a graph of electronic signal transmissions (e.g., radio transmissions). In any embodiment depicted in FIG. 10, the graph is still subdivided into partially overlapping patches, in order to cache and reuse overlapping inference results.

Figure 12:
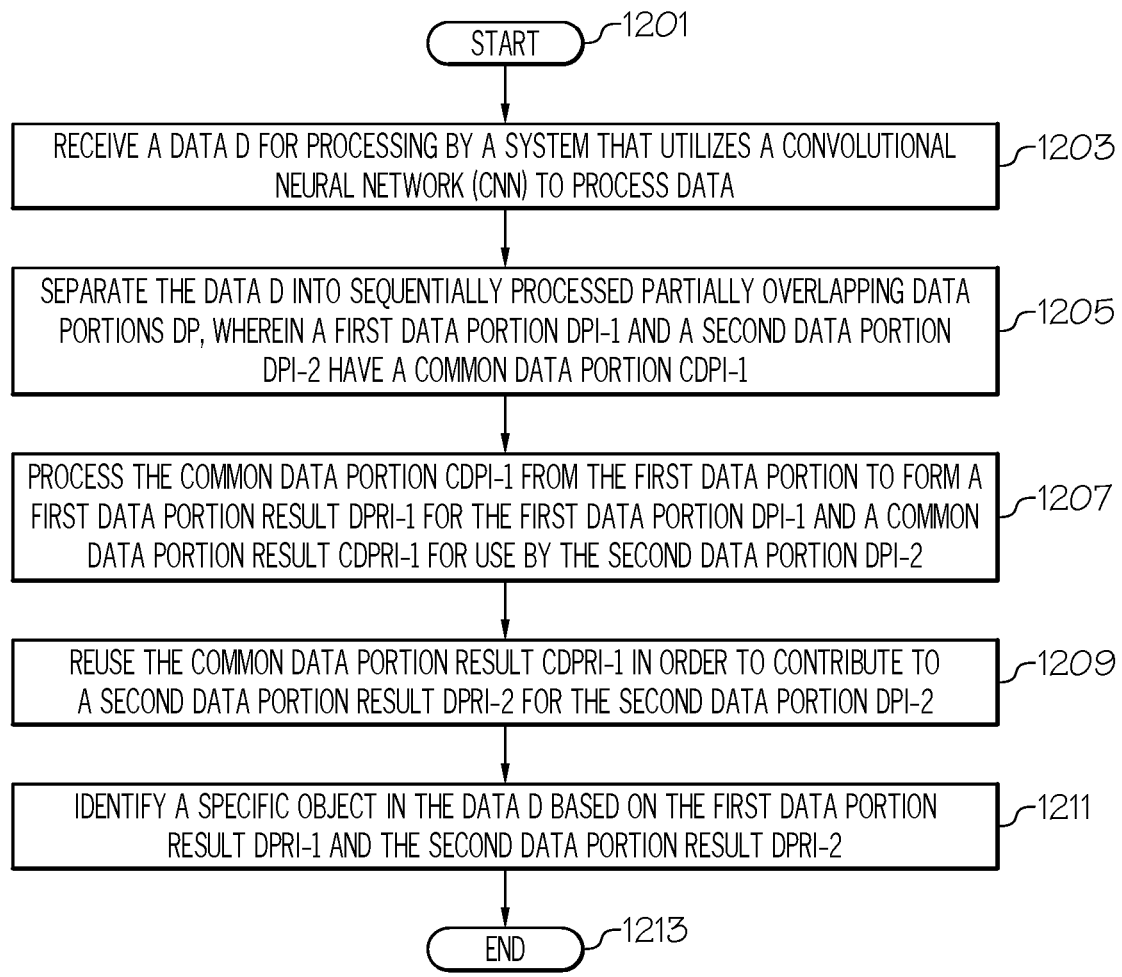
FIG. 12 is a high-level flow chart of one or more steps performed in accordance with one or more embodiments of the present invention.

With reference now to FIG. 12, another depiction of one or more embodiments of processes utilized in the present invention to optimize Convolutional Neural Network (CNN) inference time for full resolution images is presented.

After initiator block 1201, one or more processors receive a data D (e.g., the full resolution image shown in FIG. 8) for processing by a system that utilizes a Convolutional Neural Network (CNN) to process data, as described in block 1203.

As described in block 1205, the processor(s) separate the data D into sequentially processed partially overlapping data portions DP, where a first data portion DPi-1 (e.g., patch 810a shown in FIG. 8) and a second data portion DPi-2 (e.g., patch 810b shown in FIG. 8) have a common data portion CDPi-1 (e.g., overlapping area 806 shown in FIG. 8).

As described in block 1207, the processor(s) process the common data portion CDPi-1 from the first data portion to form a common data portion result CDPRi-1 for the second data portion DPi-2. That is, when the common data portion result CDPRi-1 is run through the CNN for inference purposes, the results are cached for use by the second data portion DPi-2.

As described in block 1209, the processor(s) then reuse the common data portion result CDPRi-1 in order to contribute to a second data portion result DPRi-2 for the second data portion DPi-2. That is, the second data portion result DPRi-2 is the inference result of running the second data portion DPi-2 through the CNN, except that the common data portion result CDPRi-1 does not need to be re-inferred in the CNN.

As described in block 1211, the processor(s) then identify a specific object in the data D based on the first data portion result DPRi-1 and the second data portion result DPRi-2.

The flow-chart ends at terminator block 1213.

In an embodiment of the present invention, data D is a full resolution image, and the method further comprises labeling, by one or more processors, the specific object on a display of the full resolution image based on inferring the data portion result DPRi-2 onto the CNN in order to identify the specific object within the second data portion DPi-2. (See FIG. 8.)

In an embodiment of the present invention, the common data portion CDPi-1 is the first data portion DPi-1. That is, the common data portion CDPi-1 includes all of the first data portion DPi-1.

In an embodiment of the present invention, the overlapping data portions DP are increasing sizes, and the DPi-1 is contained in the DP. (See FIG. 10.)

In an embodiment of the present invention, the processor(s) determine the overlapping data portions DP based on readings from a motion detection device in a camera that captured the second data portion DPi-2, where the motion detection device is from a group consisting of an accelerometer, a gyroscope, a global positioning sensor (GPS) positioning device, and a motion tracker. That is, physical motion sensors in the camera detect movement of the camera, which results in different patches in the full resolution image. That is, assume that the camera is a motion picture camera. As such, the overlapping regions are between two frames in the captured motion picture. These overlapping regions are shared in the inference process described herein.

In an embodiment of the present invention, the data D describes a low resolution image, each data portion DPi is processed by the CNN, and the CNN is trained on a high resolution image. That is, when the entire data D (e.g., the photograph shown in FIG. 8) is viewed, the overall resolution is low, since detail in the patches cannot be seen. However, the CNN is trained on a high resolution image. Thus, when the CNN is used to infer information from the photograph, the information extracted from each patch includes more information than is visible to the human eye. This additional (high resolution) information is fed into the CNN, in order to infer and identify objects in the photograph (data D) that were not initially visible to the viewer.

In an embodiment of the present invention, the overlapping data portions DP are determined by a sliding window. That is, the system slides patch 810a and patch 810b (see FIG. 8) relative to one another by using a sliding window, which moves one or both of the patches 810a/810b, thereby defining their overlapping area 806.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 13:
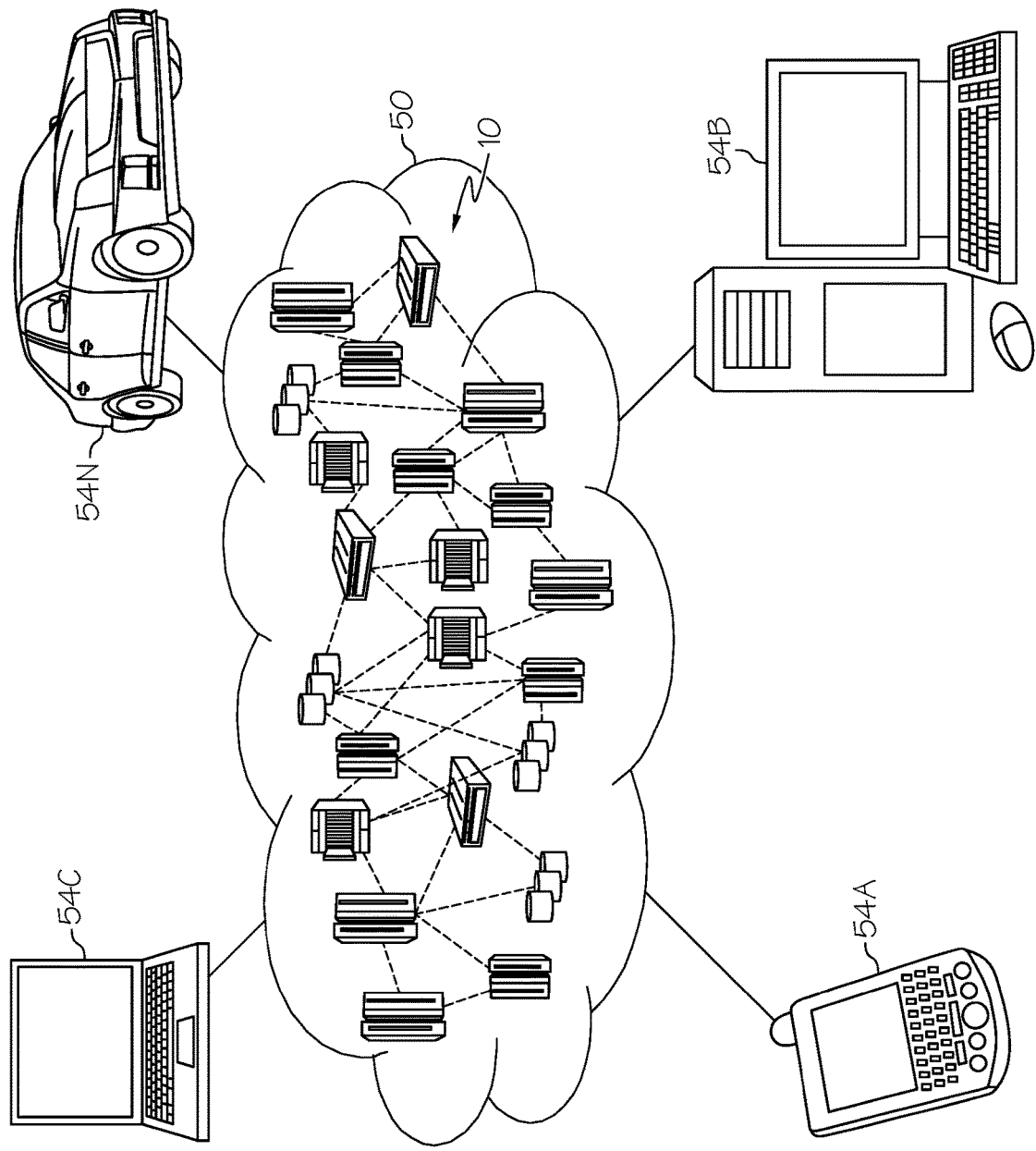
FIG. 13 depicts a cloud computing environment according to an embodiment of the present invention.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 13 are intended to be illustrative only and that computing nodes 10 and cloud computing environment 50 can communicate with any type of computerized device over any type of network and/or network addressable connection (e.g., using a web browser).

Figure 14:
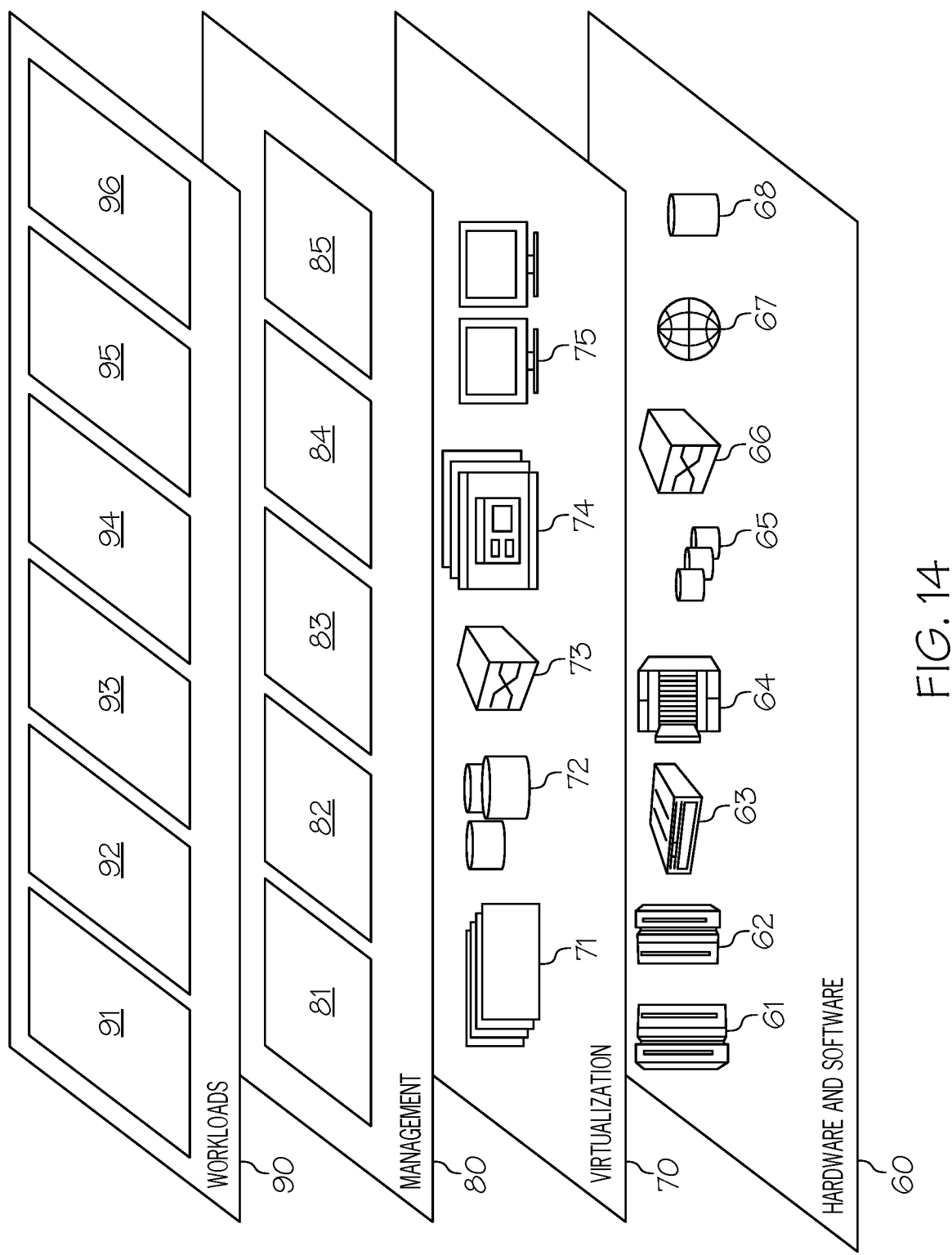
FIG. 14 depicts abstraction model layers of a cloud computer environment according to an embodiment of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and image processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method to optimize Convolutional Neural Network (CNN) inference time during inference processing for full resolution images, wherein inference processing determines that an object partially depicted in a first visual image is a same object partially depicted in a second visual image, and wherein the method comprising:
    dividing, by one or more processors, a full resolution image of a specific object into a plurality of partially overlapping sub-images;
    selecting, by one or more processors and from the plurality of partially overlapping sub-images, a first sub-image and a second sub-image that overlap one another in an overlapping area;
    feeding, by one or more processors, the first sub-image, including the overlapping area, into a Convolutional Neural Network (CNN) in order to create a first inference result for the first sub-image, wherein the CNN has been trained at a fine resolution to recognize by inference processing the specific object from an image of the specific object, wherein the first inference result comprises an overlapping inference result for the overlapping area, wherein the first inference result describes a first portion of the specific object based on the first sub-image, and wherein the overlapping inference result recognizes a partial portion of the specific object based on the overlapping area;
    caching, by one or more processors, the overlapping inference result from the CNN for the overlapping area;
    utilizing, by one or more processors, the cached overlapping inference result when inferring the second sub-image in the CNN, wherein inferring the second sub-image creates a second inference result that recognizes, by inference processing, a second portion of the specific object based on the second sub-image, and wherein the inference processing recognizes the specific object as being partially depicted in the second sub-image based on the CNN recognizing the overlapping area as partially depicting a portion of the full resolution image of the specific object;
    training the CNN to identify the specific object by using the first inference result as a first input to the CNN, wherein training the CNN to identify the specific object by using the first inference result as the first input to the CNN creates a trained CNN;
    utilizing the trained CNN to identify the partial portion of the specific object by using the partial portion of the specific object as a second input to the trained CNN; and
    identifying, by the trained CNN, the specific object in the full resolution image, based on inference processing recognizing the first sub-image and the second sub-image as being sub-images of a same type of object, and further based on the trained CNN processing the first inference result and the partial portion of the specific object as inputs to the trained CNN.

2. The method of claim 1, further comprising:
    labeling, by one or more processors, the specific object within the second sub-image on a display of the full resolution image based on a CNN computation of the second sub-image.

3. The method of claim 1, wherein the full resolution image is a stream of data.

4. The method of claim 1, wherein the full resolution image is a photograph of a physical scene.

5. The method of claim 1, wherein the full resolution image is a graph of a stream of sound.

6. The method of claim 1, wherein the full resolution image is a graph of electronic signal transmissions for a specific sound, and wherein the specific object in the full resolution image that is identified based on inferring the first sub-image and the second sub-image is the specific sound.

7. A method to optimize Convolutional Neural Network (CNN) inference time for full resolution images, the method comprising:
    receiving, by one or more processors, a data D for processing by a system that utilizes a Convolutional Neural Network (CNN) to process data;
    separating, by one or more processors, the data D into sequentially processed partially overlapping data portions DP, wherein a first data portion DPi-1 and a second data portion DPi-2 have a common data portion CDPi-1;
    processing, by one or more processors, the common data portion CDPi-1 from the first data portion to form a first data portion result DPRi-1 for the first data portion DPi-1 and a common data portion result CDPRi-1 for use by the second data portion DPi-2, wherein the first data portion DPi-1 represents a first portion of the object, wherein the first data portion result DPRi-1 provides a description of the first portion of the object represented by the data D, wherein the second data portion DPi-2 represents a second portion of the object represented by the data D, and wherein the common data portion result DFPRi-1 describes a shared component represented by both the first data portion DPi-1 and the second data portion DPi-2;
    reusing, by one or more processors, the common data portion result CDPRi-1 in order to contribute to a second data portion result DPRi-2 for the second data portion DPi-2, wherein the second data portion result DPRi-2 provides a description of the second portion of the object represented by the data D;

training the CNN to identify the specific object by using the first inference result as a first input to the CNN, wherein training the CNN to identify the specific object by using the first inference result as the first input to the CNN creates a trained CNN;

utilizing the trained CNN to identify the partial portion of the specific object by using the partial portion of the specific object as a second input to the trained CNN; and identifying, by one or more processors, the specific object represented by the data D based on the first data portion result DPRi-1 and the second data portion result DPRi-2, wherein the trained CNN utilizes inference processing to recognize the specific object as being partially depicted in the second sub-image based on the trained CNN recognizing the overlapping area as partially depicting a portion of the full resolution image of the specific object.

8. The method of claim 7, where data D is a full resolution image, and wherein the method further comprises:

labeling, by one or more processors, the specific object on a display of the full resolution image based inferring the data portion result DPRi-2 onto the trained CNN in order to identify the specific object within the second data portion DPi-2.

9. The method of claim 7, wherein the common data portion CDPi-1 is the first data portion DPi-1.

10. The method of claim 7, wherein the overlapping data portions DP are increasing sizes, and wherein the DPi-1 is contained in the DP.

11. The method of claim 7, further comprising:

determining, by one or more processors, the overlapping data portions DP based on readings from a motion detection device in a camera that captured the second data portion DPi-2, wherein the motion detection device is from a group consisting of an accelerometer, a gyroscope, a global positioning sensor (GPS) positioning device, and a motion tracker.

12. The method of claim 7, wherein the data D describes a low resolution image, wherein each data portion DPi is processed by the trained CNN, and wherein the trained CNN is trained on a high resolution image.

13. The method of claim 7, wherein the overlapping data portions DP are determined by a sliding window.

14. The method of claim 7, wherein the data D is a photograph of a physical scene.

15. The method of claim 7, wherein the data D is a graph of a stream of sound.

16. The method of claim 8, wherein the full resolution image is a graph of electronic transmissions of speech, wherein the graph has a time axis, wherein the graph has a frequency axis that is visually coded to create a visually coded graph that indicates an intensity of signals in the electronic transmissions at each time and frequency on the graph, and wherein the method further comprises:

sliding, by the trained CNN, a window over the visually coded graph in order to perform speech recognition of the speech in the electronic transmissions by the trained CNN.

17. A computer program product comprising a computer readable storage medium having program code embodied therewith, wherein the computer readable storage medium is not a transitory signal per se, and wherein the program code is readable and executable by a processor to perform a method comprising:

receiving a data D for processing by a system that utilizes a Convolutional Neural Network (CNN) to process data;

separating the data D into sequentially processed overlapping data portions DP, wherein a first data portion DPi-1 and a second data portion DPi-2 have a common data portion CDPi-1; processing, by one or more processors, the common data portion CDPi-1 from the first data portion to form a first data portion result DPRi-1 for the first data portion DPi-1 and a common data portion result CDPRi-1 for use by the second data portion DPi-2, wherein the first data portion DPi-1 represents a first portion of the object, wherein the first data portion result DPRi-1 provides a description of the first portion of the object represented by the data D, wherein the second data portion DPi-2 represents a second portion of the object represented by the data D, and wherein the common data portion result DFPRi-1 describes a shared component represented by both the first data portion DPi-1 and the second data portion DPi-2;

reusing, by one or more processors, the common data portion result CDPRi-1 in order to contribute to a second data portion result DPRi-2 for the second data portion DPi-2, wherein the second data portion result DPRi-2 provides a description of the second portion of the object represented by the data D;

training the CNN to identify the specific object by using the first inference result as a first input to the CNN, wherein training the CNN to identify the specific object by using the first inference result as the first input to the CNN creates a trained CNN;

utilizing the trained CNN to identify the partial portion of the specific object by using the partial portion of the specific object as a second input to the trained CNN; and inferring the data portion result DPRi-2 onto the trained CNN in order to identify the specific object within the second data portion DPi-2, wherein the trained CNN utilizes inference processing to recognize the specific object as being partially depicted in the second sub-image based on the trained CNN recognizing the overlapping area as partially depicting a portion of the full resolution image of the specific object.

18. The computer program product of claim 17, wherein the method further comprises:

determining, by the trained CNN, that an other set of data comprises the common data portion CDPi-1, and in response to determining that other set of data comprises the common data portion CDPi-1, determining, by one or more processors, that the other set of data represents the specific object.

19. The method of claim 1, further comprising:

performing, by cloud-based computers, the dividing, selecting, feeding, and caching steps; and performing by an edge device, the utilizing and identifying step, wherein the edge device is a digital camera that captures an image of the specific object, and wherein the digital camera lacks computational resources that are required to perform the dividing, selecting, feeding, and caching steps to identify the specific object in the image captured by the digital camera.

20. The computer program product of claim 17, wherein the program instructions are provided as a service in a cloud environment.

* * * * *